(12) United States Patent
Buer

(10) Patent No.: US 6,771,930 B2
(45) Date of Patent: Aug. 3, 2004

(54) SYSTEM AND METHOD FOR UPLINK POWER CONTROL

(75) Inventor: Kenneth V. Buer, Gilbert, AZ (US)

(73) Assignee: U.S. Monolithics, L.L.C., Chandler, AZ (US)

(*) Notice: Subject to any disclaimer, the term of this patent is extended or adjusted under 35 U.S.C. 154(b) by 631 days.

(21) Appl. No.: 09/867,008

(22) Filed: May 29, 2001

(65) Prior Publication Data

US 2002/0173270 A1 Nov. 21, 2002

Related U.S. Application Data

(63) Continuation-in-part of application No. 09/810,995, filed on Mar. 16, 2001.

(51) Int. Cl.$^7$ .......................... H04H 1/00; H04B 7/185; H01Q 11/12; H04B 7/005
(52) U.S. Cl. .................... 455/13.4; 455/3.02; 455/3.05; 455/127.11; 455/129; 455/522
(58) Field of Search .............................. 455/3.01, 3.04, 455/3.05, 130, 131, 132, 127.1, 127.2, 127.3, 127.4, 127.5, 129, 69, 13.4, 522, 92

(56) References Cited

U.S. PATENT DOCUMENTS

| | | | |
|---|---|---|---|
| 4,038,600 A | | 7/1977 | Thomas |
| 4,752,967 A | * | 6/1988 | Bustamante et al. ....... 455/13.4 |
| 5,257,415 A | * | 10/1993 | Kumagai et al. .......... 455/126 |
| 5,426,395 A | * | 6/1995 | Cygan .................... 330/207 P |
| 5,432,501 A | * | 7/1995 | Yoon .......................... 340/650 |
| 5,566,363 A | * | 10/1996 | Senda ........................ 455/126 |
| 5,678,210 A | * | 10/1997 | Hannah ...................... 455/128 |
| 5,754,493 A | * | 5/1998 | Al-Chalabi .................. 367/38 |
| 5,869,986 A | * | 2/1999 | Haque et al. ................ 327/61 |
| 5,912,641 A | * | 6/1999 | Dietrich ..................... 342/354 |
| 6,035,008 A | | 3/2000 | Kim |
| 6,052,568 A | * | 4/2000 | Williams .................... 455/126 |
| 6,256,483 B1 | * | 7/2001 | Moerder et al. ......... 455/115.1 |
| 6,353,360 B1 | | 3/2002 | Hau et al. |
| 6,556,807 B1 | * | 4/2003 | Horie et al. ............... 455/3.02 |
| 6,587,002 B1 | | 7/2003 | Vogt |
| 6,662,018 B1 | * | 12/2003 | Kintis et al. ................ 455/522 |

FOREIGN PATENT DOCUMENTS

| | | |
|---|---|---|
| JP | 04351021 A | 12/1992 |
| JP | 2000295048 A | 10/2000 |
| WO | WO 99/21291 A1 | 4/1999 |

* cited by examiner

Primary Examiner—William Trost
Assistant Examiner—Meless Zewdu
(74) Attorney, Agent, or Firm—Snell & Wilmer L.L.P.

(57) ABSTRACT

An uplink power control system and method of the present invention includes a current sensing technique for predicting the P1 dB power compression point. A DC current sensor detects the level of DC current transmitted from a control unit to an antenna unit of the system. The current measurements are analyzed to generate a theoretical prediction of amplifier linearity as the power levels are increased. The change in DC current indicates an inflection point where the amplifier no longer behaves linearly to an increase in RF power. The inflection point is found by determining the various derivatives of the DC current curve. Analyzing the derivatives not only provides an accurate and consistent assessment of the P1 dB compression point, but also provides a prediction of the output power, and thus future performance of the system.

31 Claims, 8 Drawing Sheets

Figure 6
Accuracy of Absolute Power Prediction

SYSTEM AND METHOD FOR UPLINK POWER CONTROL

CROSS REFERENCE TO RELATED APPLICATIONS

This application is a continuation-in-part of U.S. patent application Ser. No. 09/810,995 filed on Mar. 16, 2001, of which the entire disclosure is hereby incorporated by reference.

FIELD OF INVENTION

The present invention relates generally to a system and method for uplink power control and detection in a communication system.

BACKGROUND OF THE INVENTION

Figure 1:
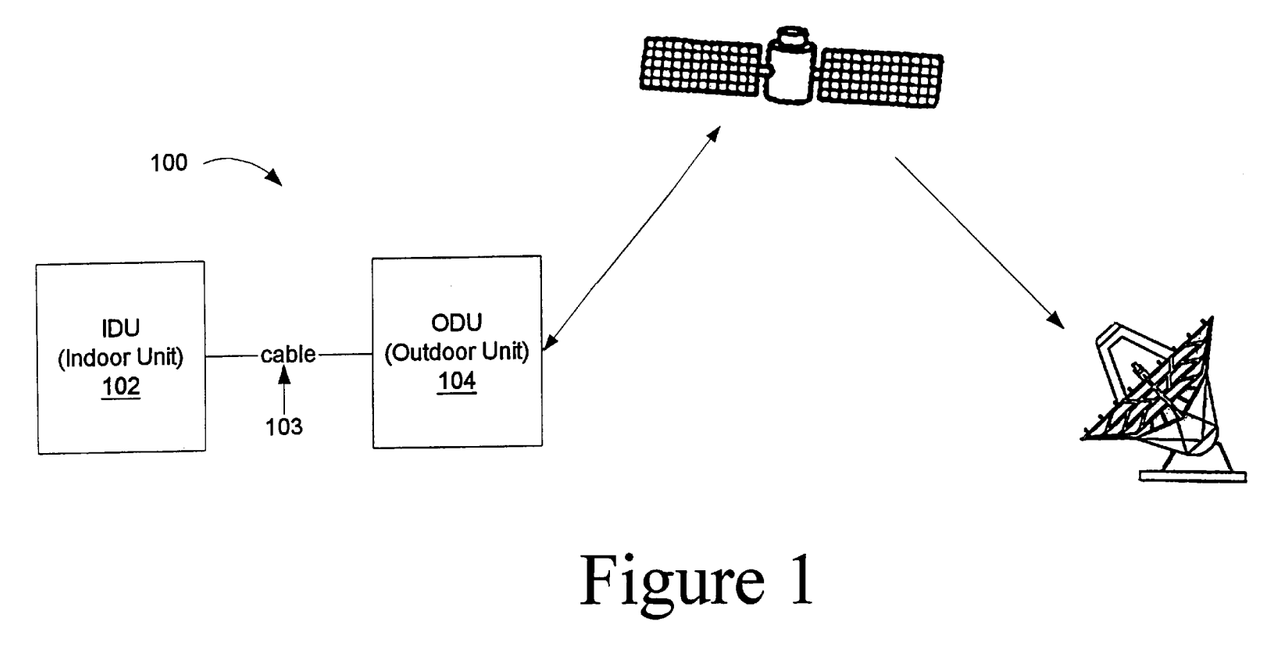
FIG. 1 illustrates, in block format, a typical power control scheme for a satellite communication system.

Communication systems, such as satellite communication systems, typically include one or more control loops for power transmission. FIG. 1 illustrates, in block format, a typical power detect and control scheme for a satellite communication system. System 100 includes an indoor unit (IDU) 102 which provides signals to an outdoor unit (ODU) 104 over a cable 103. Generally, IDU 102 is configured to control the level of the RF (radio frequency) signal to be transmitted to a satellite. For example, by increasing or decreasing the signals provided to ODU 104, IDU 102 can vary the output power of the RF signal transmitted to the satellite.

Collectively, IDU 102, ODU 104, and cable 103 are generally termed "ground station". The ground station may be located on, for example, a stationary structure (e.g., building) or a moving structure (e.g., vehicle) such that communication with the satellite is permissible. In many applications, the IDU is located near or within a computer, e.g., a card that fits inside the computer processor or a box in proximity to the computer. The cable or multiple cables interconnect the IDU with the ODU, which may be located outside, e.g., on the roof of a building or a vehicle. Another ground station, generally illustrated in FIG. 1 as a dish antenna, provides similar functionality for the opposite end of the communication link in order to connect the user of ground station 100 to a telecommunications or computer network.

As is often the case in wireless transmission, obstructions, e.g., clouds, rain, structures, and the like, can decrease the transmission reception of the RF signal received at the satellite, i.e., the signal-to-noise (SNR) of the RF signal decreases. The satellite may transmit a signal back to the ground station indicating that the RF signal received at the satellite is too weak, for example, the strength (i.e., power level) of the received signal is too low for optimum detection. In response, the ground station typically has two options; reduce the data bit rate (which is generally undesirable) by either a method of bandwidth reduction or increased error correction coding, or increase the RF signal strength. To increase the RF signal strength, the IDU increases the signal power to the ODU, thereby increasing the RF signal strength transmitted to the satellite.

ODU 104 includes a power amplifier (not shown) to increase or boost the RF signal in preparation for transmission to the satellite. Power amplifiers are often characterized by the maximum power capability of the device. For instance, as increasing RF power is supplied to an amplification device, the output power of the device increases accordingly, until a "saturation level" of the device is reached. At saturation, or the maximum RF power capability, the amplifier output no longer behaves linearly to an increase in power, regardless of the amount of input power. When in saturation the RF waveform is "clipped" and the maximum amount of energy is contained in the primary signal. As the input power is further increased, the excess signal energy creates additional signal distortion and signal harmonics.

Signal harmonics can mix together to form a spectrum image of the primary signal in an adjacent communication channel. The adjacent channel interference caused by the power amplifier distortion begins to decrease the SNR of the signals from other users in adjacent transmission channels. To compensate for the lower SNR, the IDU of those users, operating in adjacent channels, typically increase the power to the ODU. Increasing the power continues to increase the harmonics and in turn decrease the SNR; thus the cycle continues. In addition to causing disruptive interference, governing regulatory bodies such as the FCC generally place limits on the acceptable levels of adjacent channel interference.

To reduce the interference caused by harmonics, it is desirable to control the level of power supplied to the ODU. When the input signal is amplified by about 1 dB (decibel) less than the small signal gain, it is commonly called the 1 dB compression point (P1 dB). As the input signal to the amplifier is increased past P1 dB, the output signal is no longer in a linear relationship with the input signal and a rapid decrease in gain is experienced; thereby causing signal harmonics. It is desirable to detect and limit the amount of power to a component, such as a power amplifier, to approximately P1 dB of the component to avoid creating signal harmonics which can adversely affect signal transmission.

Figure 2:
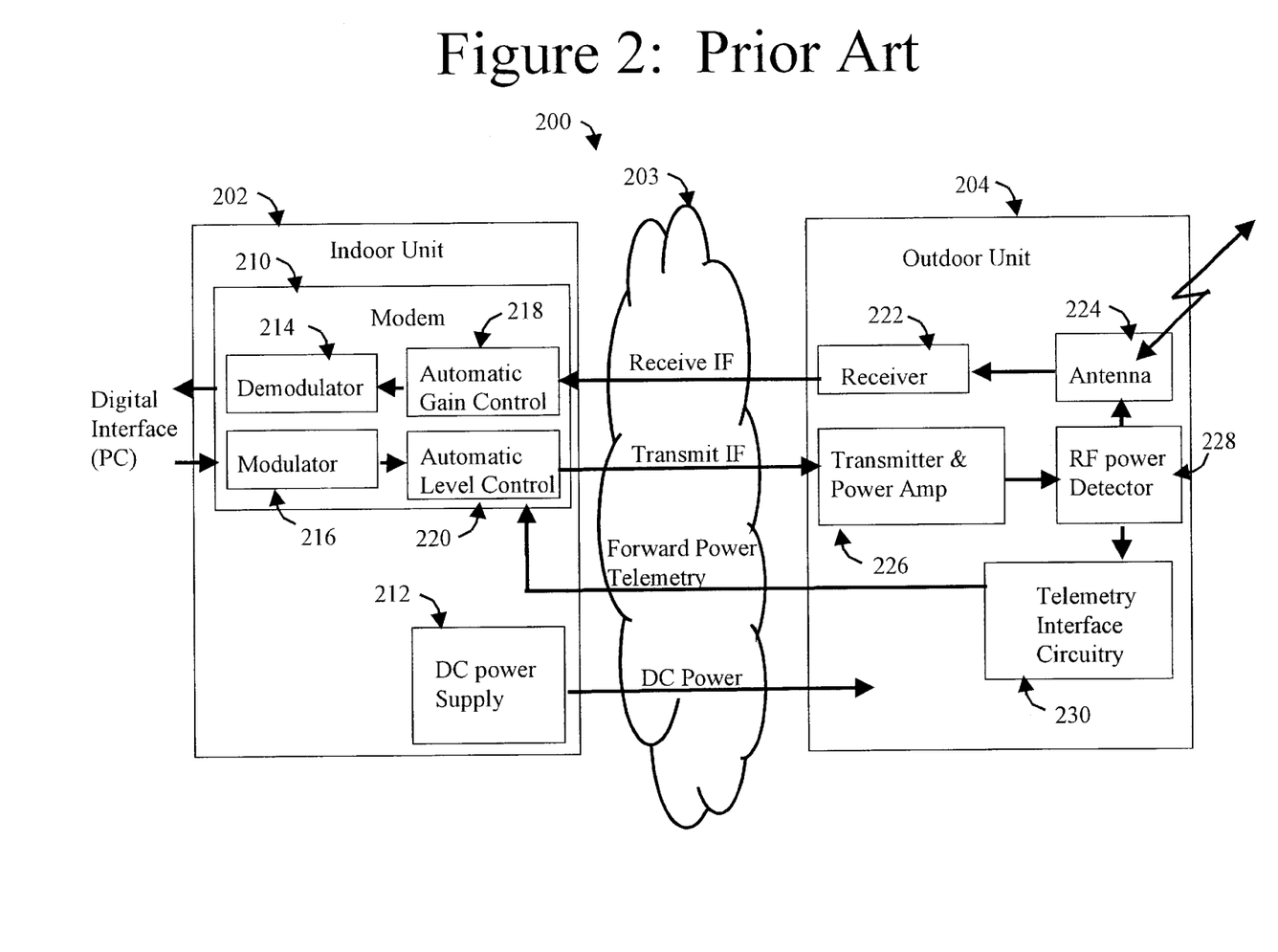
FIG. 2 illustrates, in block format, a ground station for uplink power control of the prior art.

Referring to FIG. 2, a ground station 200 of a prior art uplink power detect and control system is illustrated. Ground station 200 includes an IDU 202, an ODU 204, and signal transfer means 203. Signal transfer means 203 includes, for example, one or more cables suitable for signal transmission between IDU 202 and ODU 204, e.g., industry standard RG-6 type cable (coax) such as Belden 9114.

Generally, IDU 202 includes a modem 210 to receive and transmit IF (intermediate frequency) signals to ODU 204 and a DC (direct current) power supply 212 to transmit DC power to ODU 204. A typical modem 210 has a demodulator 214, a modulator 216, an automatic gain control 218, and an automatic level control 220. Demodulator 214 converts the received IF signals into digital data which can be coupled to a computer or other digital appliance via a serial or parallel digital interface. Automatic gain control 218 is used to adjust the input IF signal level up or down to provide an approximately constant signal level to demodulator 214. Modulator 216 converts digital data from the serial or parallel digital interface to an IF signal. Automatic level control 220 is used to increase or decrease the output signal level provided to the ODU based on link conditions (e.g., weather, temperature, interference, etc.).

Generally, ODU 204 includes a receiver 222, an antenna 224, a transmitter and power amplifier 226, an RF power detector 228, and interface circuitry 230. The receiver 222 comprises a low noise amplifier to amplify the input RF signal from the antenna and a down conversion mixer to convert the RF signal to an IF signal. Additionally, receiver 222 may contain one or more RF, IF or local oscillator (LO) amplifiers as well. Antenna 224 may be any antenna suitable for receiving and transmitting the proper frequencies; such as a dish, dipole, phased array, or any other suitable antenna. Transmitter 226 receives the IF signal from IDU 202. A signal mixer (not shown) within transmitter 226 generates an RF signal from the received IF and DC signals. Transmitter 226 also comprises a power amplifier, e.g., a high power amplifier (HPA), which boosts the RF signal in preparation for transmission to the satellite.

Inclusion of RF power detector 228 is one prior art technique for detecting and limiting the power to transmitter 226 by means of the automatic level control 220 for reducing the effects of signal interference. RF power detector 228 (also called a "forward power detector") generally includes a coupler, detector diode, comparator, and signal transmission means (e.g., interface circuitry 230) for transmitting signals back to IDU 202.

In operation, RF power detector 228 samples the output signal from the power amplifier (prior to antenna transmission) and sends the signal back to the IDU. Interface circuitry 230 is required in order to use automatic level control 220. An additional signal transfer means 203, e.g., an additional cable or multiplexing circuitry, is required to transmit the output RF signal from ODU 204 to IDU 202 (generally illustrated in FIG. 2 as "Forward Power Telemetry"). Using the sampled power output at the ODU, the IDU can gauge how much more power station 200 can transmit without causing the amplifier to go into compression.

There are significant disadvantages to the forward power detector system of the prior art. For example, each of the components in the forward power detector system, e.g., diode, coupler, op amp, operate differently under environmental variations, in particular to temperature changes. To accommodate for the variations, each system using a forward power detector unit must be calibrated individually under various conditions. This data must then be stored in an accessible database for each unit for subsequent reference. Such data collection is labor intensive, requires memory storage, and is susceptible to erroneous calculations.

Also, the forward power detector system of the prior art draws power from the output of the power amplifier. Any power loss at the output of the amplifier must be compensated for by increasing the overall output of the amplifier. This is not always trivial. In fact, the cost of the power amplifier unit is often dependent upon the power output capabilities of the unit. Therefore, as more output power is required to account for loss, a more expensive power amplifier is generally needed.

In addition, interfacing the signals from the forward power detector system to the IDU can require additional cables or multiplexing circuitry, complex interface components and circuitry, or a combination of both.

Another technique for detecting power levels includes detecting the input power to a FET-based amplifier by gate current sensing. As RF power is increased to the amplifier, the gate-source junction of the FET mimics the behavior of a schottky diode. The input RF signal becomes rectified, resulting in a net DC current into the device. A relationship between the input power level and the gate current can then be established through careful monitoring of the gate-source junction.

While the gate current sensing technique overcomes some of the problems associated with the forward power detector system, e.g., eliminates the hardware at the power amplifier output and reduces system loss, disadvantages to the gate current sensing technique are readily identified. Due to system variations that are inherent to the component and the environment of the unit, this technique is extremely susceptible to error. For example, gate current sensing measures the input drive power to the amplifier, not the output power which is the relevant measurement. While it is feasible to determine the output power mathematically from the input power and the gain, this calculation can vary substantially due to gain variations caused by environmental changes, unit variations, and the like. Therefore, as the gain of the amplifier changes, the calculated output power will change.

Moreover, the diode characteristics of the FET amplifier vary from device to device; thereby increasing the risk of erroneous readings. Under high RF input drive, the normally reverse biased gate-drain junction can begin to breakdown and cause a net current flow out of the gate. Accurate gate current readings may be difficult due to some or all of the current flow into the gate being cancelled.

Accordingly, an improved system and method for power control in a communication system is needed. In particular, a power control and detection system, that is substantially independent from environmental variations, for providing improved detection accuracy without substantially increasing cost, components, and system interconnect requirements is needed.

Additionally, the electronic industry commonly measures the output power of amplifiers to correspond with the P1 dB point. For example, a 4 watt amplifier will typically have a P1 dB at approximately 4 watts. Thus, it would be advantageous to also have an accurate means for determining and/or predicting the absolute output power of the amplifier.

SUMMARY OF THE INVENTION

According to various aspects of the present invention, a ground station system includes a signal control unit responding to a computer program coupled to the unit. The program includes code to instruct the signal control unit to control the power level of a transmitted RF signal in accordance with a DC current sensing system such that the transmitted signal is at or below a P1 dB compression point of the system.

In accordance with a method of the present invention, a signal control station receives a signal for transmission at a transceiver unit from a control unit. The control unit detects the DC current being supplied to the transceiver. At least one derivative is determined from a mathematical expression derived from the detected DC current values. The signal is modulated in accordance with the determining step and transmitted from the transceiver accordingly.

In accordance with a computer program of the present invention, instructions executable by a processing means cause the determination of the compression point in an uplink power control system. A signal is generated to produce an RF signal. A current level is detected in the signal and a derivative is determined from at least two detected current levels. The compression is determined from the derivative and is compared to a maximum compression.

In accordance with an embodiment of the present invention, the systems and methods disclosed herein provide a prediction of the output power in a transmission signal for use in a power control system. In addition, the accuracy of the prediction can be improved and the future performance of the system can be determined.

BRIEF DESCRIPTION OF THE DRAWINGS

These and other features, aspects and advantages of the present invention will become better understood with reference to the following description, appending claims, and accompanying drawings where:

DETAILED DESCRIPTION OF EXEMPLARY EMBODIMENTS

The present invention relates to a system and method for power control in a communication system. The power control system according to various aspects of the present invention requires minimum hardware to implement with no additional telemetry interface. In addition, the power control system of the present invention provides control of the output power that is substantially independent from environmental variations. The power control system in accordance to various embodiments of the invention provides an accurate and reliable method for determining and controlling the output power of, for example, a power amplifier. In particular, the input current to the amplifier is suitably detected and utilized to determine the P1 dB point of the amplifier. The input power can then be controlled to remain at or below the P1 dB point.

Figure 3:
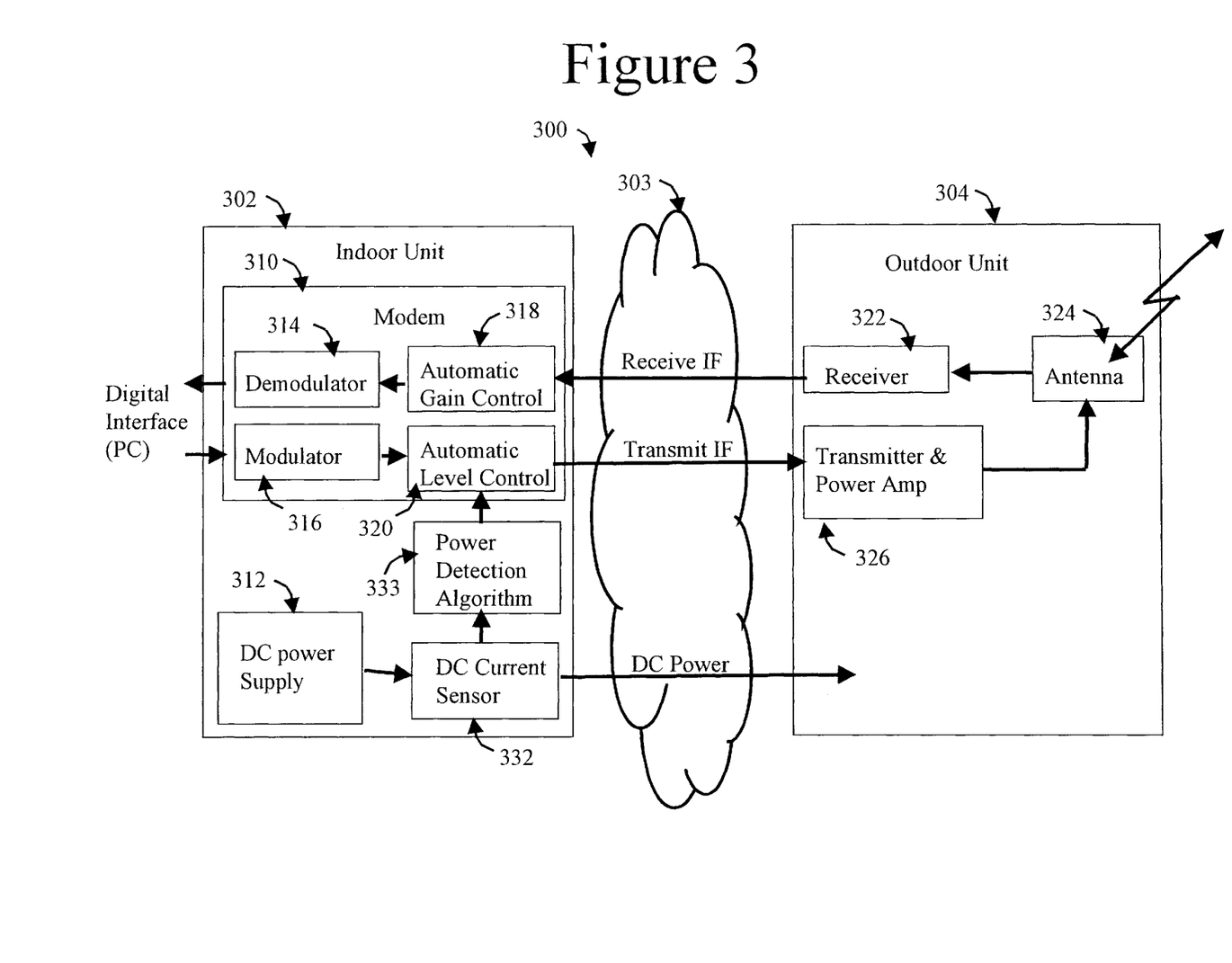
FIG. 3 illustrates, in block format, a ground station for uplink power control in accordance with the present invention.

FIG. 3 illustrates, in block format, an exemplary ground station system 300 for uplink power control in accordance with the present invention. System 300 includes an indoor unit (IDU) 302, an outdoor unit (ODU) 304, and signal transfer means 303. Signal transfer means 303 includes, for example, a cable suitable for two-way signal transfer between IDU 302 and ODU 304, e.g., a cable similar to the cable described for signal transfer means 203. However, unlike signal transfer means 203 of the prior art, which generally requires a separate cable for forward power telemetry transfer, signal transfer means 303 does not require a transfer means for forward power telemetry. Therefore, signal transfer between the IDU and ODU of the present invention can be accomplished using a single cable or coax.

Similar to ODU 204 of the prior art, ODU 304 of the present invention includes a receiver 322, an antenna 324, and a transmitter and power amplifier 326. Elements 322 through 326 perform substantially the same functions and may include the same or equivalent components as elements 222 through 226 of prior art ODU 204. Thus, these elements and their functions are well known in the industry and will not be described in detail herein, nor will their functions be repeated.

It should be noted, however, that ODU 304 of the present invention does not include a forward power detection system (e.g., RF power detector 228 and interface circuitry 230) of the prior art ODU 204. Eliminating the power detection system at the output of the power amplifier, permits the RF signal to be delivered to antenna 324 with very little power loss (i.e., no power is being drawn from the output to a detection system thereby increasing the power loss). In fact under normal conditions, the power loss associated with the transfer of the RF signal from power amplifier 326 to antenna 324 is loss inherent in any signal routing circuitry and is generally insignificant over short lengths.

Moreover, removing the power detection system at the ODU abolishes the need to transmit the telemetry signal back to the IDU for analysis. Thus, the forward power telemetry and complex interface circuitry that is generally required in the ODU of the prior art is not needed in the ODU of the present invention. As a result, the cabling requirement between the IDU and ODU is reduced, and in many cases, a single cable is capable of handling all the signal transmissions.

IDU 302 includes a modem 310 to receive and transmit IF signals to ODU 304 and a DC power supply 312 to transmit DC power to ODU 304. Similar to modem 210, modem 310 includes a demodulator 314, a modulator 316, an automatic gain control 318, and an automatic level control 320. Elements 314 through 320 perform substantially the same functions and may include the same or equivalent components as elements 214–220 of prior art modem 210. Thus, these elements and their functions are well known in the industry; therefore, they will not be described in detail herein, nor will their functions be repeated.

IDU 302, in accordance with various aspects of the present invention, includes a current sensor 332 (e.g., an ammeter). The physical and functional characteristics of current sensor 332 are well known in the industry and will not be discussed in great detail herein. Current sensor or ammeter 332 measures the DC current, for example, flowing through two terminals of the device, from DC power supply 312.

Preferably, IDU 302 further includes a processing and memory means for processing, among other things, the DC current measurements, and storing the measurements for subsequent use. As will be discussed in further detail below, the present invention utilizes past and present DC current measurements to determine a current inflection point of the power amplifier located in ODU 304.

As previously discussed, it is desirable to detect and limit the amount of RF power into an amplification device, such as power amplifier 326, in order to keep the power amplifier in an approximately linear operation thus reducing the effects of adjacent channel signal interference. The P1 dB point, or the point where the input signal is amplified by an amount approximately 1 dB less than the linear gain level, is a reasonable limitation to place on the power control system. In other words, controlling the amplifier such that a limitation is placed on the system not to broadcast higher than the P1 dB point minimizes the risk of generating signal harmonics and adjacent channel signal interference.

Figure 4:
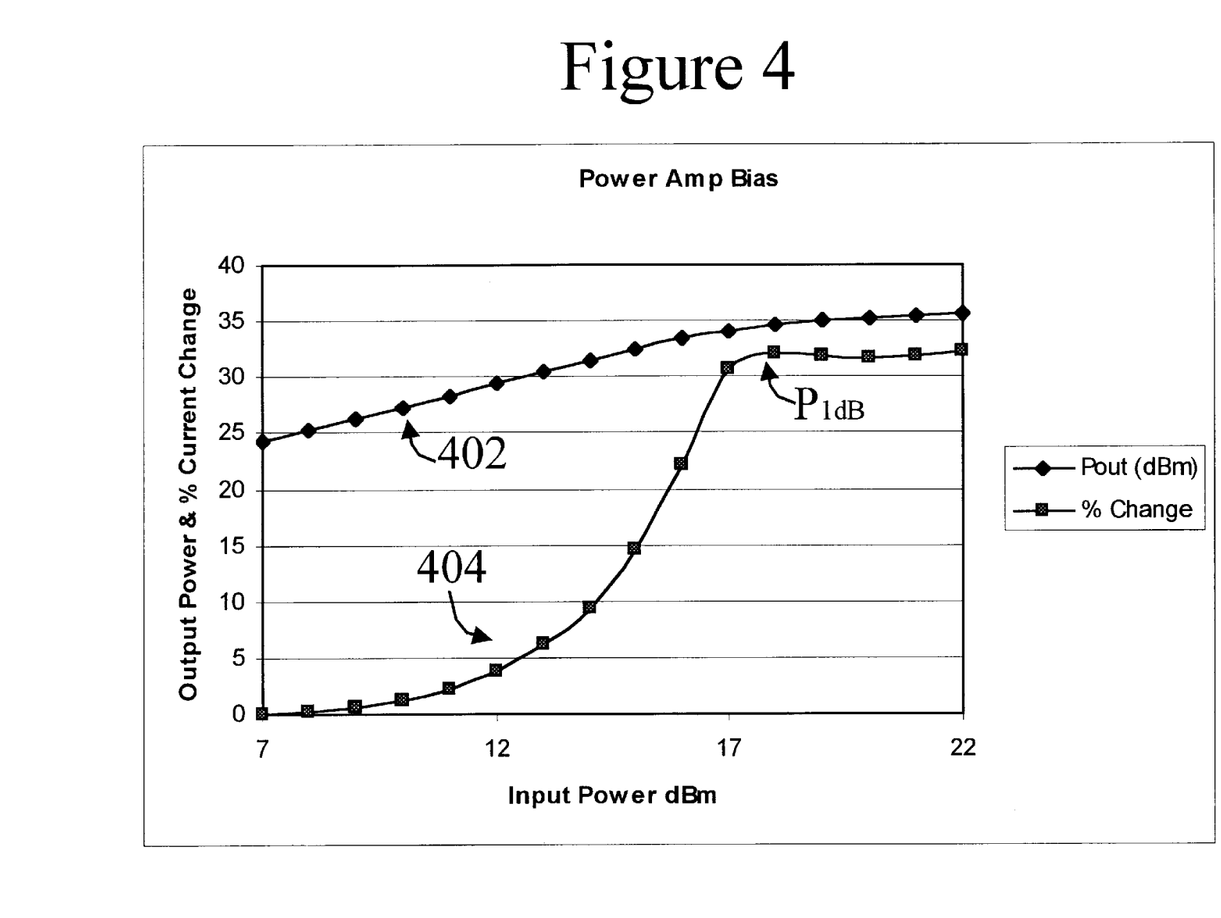
FIG. 4 is a graphical representation of the P1 dB point in accordance with a power control system of the present invention.

Referring now to FIG. 4, a graphical representation of the power compression point or P1 dB point in accordance with a power control system of the present invention is illustrated. Curves 402 and 404 illustrate, respectively, the power output in dBm (i.e., decibels "dB" relative to 1 milliwatt "m") and the change in DC current of a class AB biased power amplification device for use in an ODU of the present invention. As is commonly known in the electrical industry, power amplifiers are classified based on the conduction angle. Class AB bias is described herein as a preferred power amplification device; however, it should be realized that other classes may be equally suited.

Power output curve 402 demonstrates that as the input power to the device is increased, the output power increases linearly until the compression point is reached (e.g., at an input power of approximately 18 dBm on FIG. 4). A rapid decrease in the gain of the device, which is generally defined as the ratio of output power to input power, is experienced after the compression point. In addition, the device no longer behaves linearly to an increase in power input after the compression point.

Current curve 404 is an example which demonstrates the percentage of change in DC current from the zero or starting point. The change in DC current is caused by, and is directly related to, the amount of clipping of the RF current waveform at the power amplifier FET drain (or at the collector of an equivalent bipolar type power amplifier). In an application using a class AB biased power amplifier, the current waveform at the drain of the FET-based amplifier will clip asymmetrically at the lower side of the waveform. This causes a net positive shift in the RMS current which results in a net positive shift in the DC bias current of the device. The current curve increases monotonically as the input power is increased until a maximum current capability of the device is reached (e.g., at an input power of approximately 18 dBm on FIG. 4). After the maximum current point, the percentage of current change stabilizes and the current curve no longer behaves linearly.

The general shape of curve 404 in the linear region of the amplifier is consistent, but the curve may behave differently in the saturation region. For example, curve 404 is shown to decrease at the inflection point and then begins to increase again; but, at different operating temperatures, the curve may be flat after the inflection point, or may continue to increase but at a substantially reduced slope.

It is generally known that the output power of an amplification device (i.e., the gain) may be affected by temperature variations, and in particular, the P1 dB point on the output power curve typically moves as temperature variations occur. As previously mentioned, the present invention determines the P1 dB point by taking advantage of the relationship between the P1 dB point and the inflection in the DC current curve. Because the current curve is actually measuring the clipping of the amplifier's drain, the point of inflexion moves with the P1 dB point. In other words, by simply looking at the power-in verses the power-out of a particular amplifier or even a test group of amplifiers fails to produce accurate predications simply because the current curve tends to shift. However, while the current curve may shift back and forth or side to side, the general shape of the curve remains substantially consistent. Therefore, even under extreme temperature variations, relying on the P1 dB point as the point of inflection of the DC current curve provides an accurate, consistent, and reliable prediction technique.

With continued reference to FIG. 4, the point of inflection of current curve 404 that is of particular interest is where the concavity of the curve changes from upward to more flat or downward. One method for determining downward concavity of a function whose graph is differentiable, includes calculating the derivatives of the function. For example, if the first derivative of function decreases over an increasing x-axis interval, then the corresponding graph is concave downward. Consequently, if the values of the second derivative of the function are negative, then the first derivative is decreasing and the graph is concave downward. Under normal operation, the percentage of DC current change of an amplifier, such as amplifier 226, will behave in a similar manner as current curve 404. Therefore, referring to curve 404, the point of interest is where curve 404 changes from positive to negative, or the curve becomes concave downward. Generally, it is this point, or the point of inflection, when the second derivative of the function of the curve nears or is equal to zero. In other words, before the point of inflection, the second derivative is positive and immediately after the point of inflection the second derivative is negative.

Determining the point of inflection of the DC current curve may be performed by any suitable method, technique, mathematical calculation, equation, software, algorithm, graphic representation, or the like. As described herein, determining the point of inflection, includes determining and analyzing the derivatives of the function.

Figure 5:
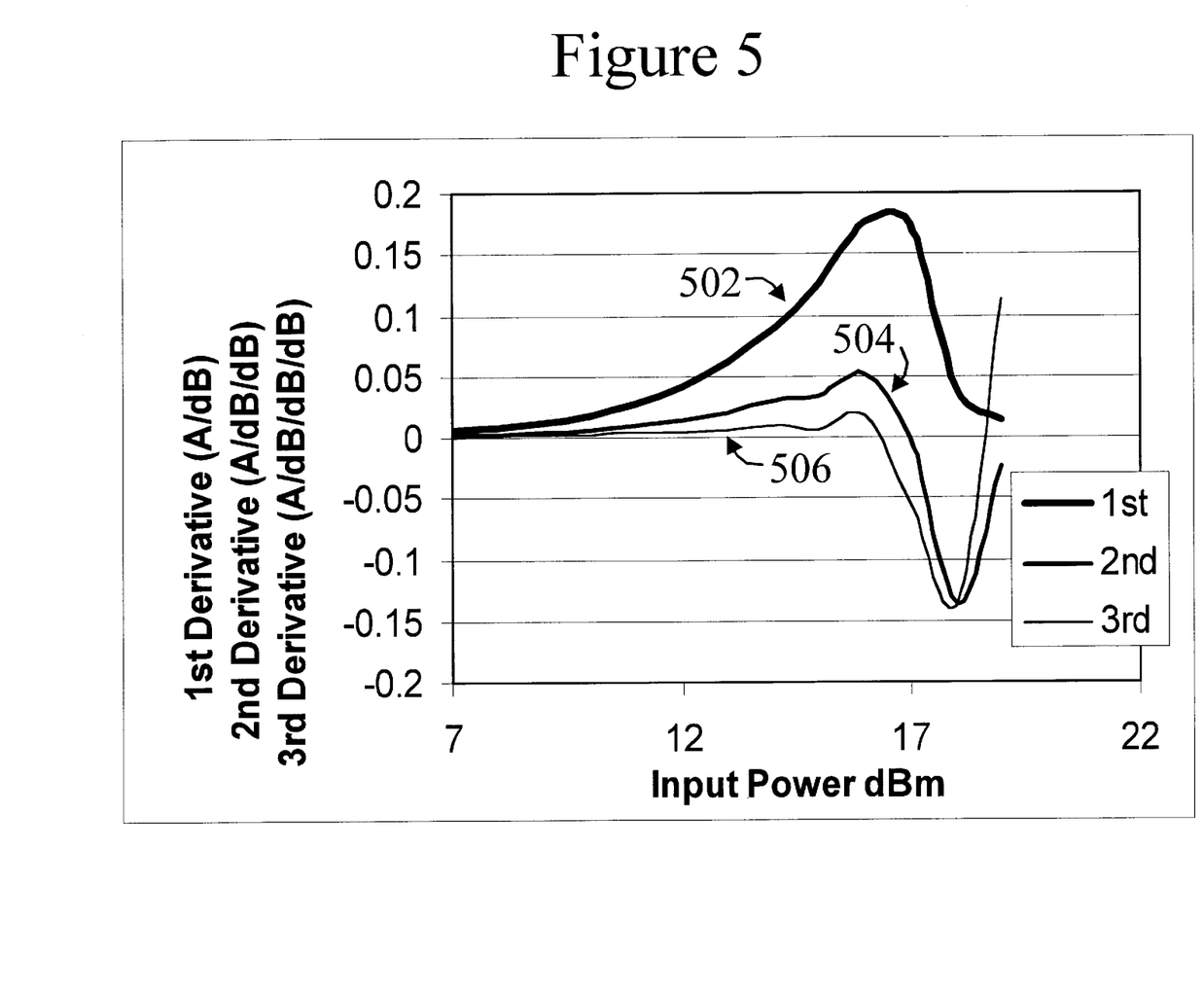
FIG. 5 is a graphical representation of the derivatives of the exemplary current curve of FIG. 4.

Referring now to FIG. 5, a graphical representation of the derivatives of the DC current curve of FIG. 4, in accordance with a power control system of the present invention, is illustrated. Curves 502, 504, and 506 represent the first, second, and third derivatives, respectively, of exemplary current curve 404.

Table 1 includes data representing compression amounts from a 4 W amplifier averaged over a 70° C. range using the system and methods disclosed herein for power detection and control. In one particular embodiment, the amount of compression is found using the preferred techniques described herein for determining P1 dB, namely, a suitable algorithm for determining the derivatives of a current curve.

TABLE 1

| Calculation | Compression | Accuracy |
| --- | --- | --- |
| Maximum of 1st derivative | 0.2 dB | ±1.2 dB |
| 2nd derivative = 0 | 0.5 dB | ±1.0 dB |
| Minimum of 3rd derivative | 0.8 dB | ±0.9 dB |
| Minimum of 2nd derivative | 1.0 dB | ±0.8 dB |

With combined reference to FIGS. 4, 5 and the data of Table 1, it is demonstrated that P1 dB or a compression amount of 1.0 dBm correlates to the minimum of the 2nd derivative of the current curve. The inflection point of curve 404, or P1 dB point, is shown at a power input of roughly 18 dBm, which is accurately portrayed as the minimum point of the second derivative curve 504.

In another embodiment, the P1 dB point may be predicted by determining the point where the second derivative is equal to zero. From the particular data of Table 1 and the corresponding Figures, we find that there are multiple zero or near zero crossings which were probably caused by noise present in the system. Moreover, with each successive derivative, the error or distortion present in the previous derivative/function becomes more significant. However, this technique may be used if little to no noise is present, or alternatively, if a smoothing function, for example, were used to average the function over a longer period of time, thereby reducing the effects of the jitter.

In addition to locating the P1 dB point of the current curve, the present invention accurately predicts several points on the power transfer curve below P1 dB. For example, additional points of interest along the derivative curves can be used to estimate how far above or below P1 dB the power amplifier is operating.

In yet another embodiment, additional calculations to include, multiplication, and weighted addition and/or subtraction of the derivative functions may be useful in estimating the entire RF compression curve.

The electrical industry commonly measures the output power of amplifiers to correspond with the P1 dB point. However, amplifiers may operate differently under varying temperatures. For example, a 4 watt amplifier may deviate from expected saturation levels by, for example, ±1 watt.

Referring again to FIG. 4, curve 402 further demonstrates that when the output power reaches about 36 dBm, the P1 dB compression point is reached. This corresponds to the general understanding that a 4 watt amplifier, which equates to 36 dBm (i.e., dBm=10 log(mW)∴36 dBm=4000 mW), should have a P1 dB point at around 4 watts. Because the system and methods of the present invention are unaffected by environmental conditions, a true and accurate means for determining and/or predicting the absolute output power of the amplifier is possible. Therefore, by predicting the output power level of the amplifier while in operation, the future performance of the amplifier relative to the input power can be assessed irrespective of the surrounding conditions.

Table 2 below illustrates data gathered for the predicted output power of a 4 W amplifier using the system and methods disclosed herein for power detection and control. In one particular embodiment, the predicted power is determined using the preferred techniques described herein for determining P1 dB, namely, a suitable algorithm for determining the derivatives of a current curve.

TABLE 2

| Calculation | Predicted Power | Accuracy |
| --- | --- | --- |
| Maximum of 1st derivative | 35.2 dBm | ±0.9 dB |
| Maximum of 2nd derivative | 34.9 dBm | ±1.5 dB |
| Maximum of 3rd derivative | 36.3 dBm | ±0.7 dB |
| Minimum of 1st derivative | 31.4 dBm | ±8.7 dB |
| Minimum of 2nd derivative | 36.0 dBm | ±0.7 dB |
| Minimum of 3rd derivative | 35.8 dBm | ±0.9 dB |
| 3rd derivative = 0 | 32.1 dBm | ±6.6 dB |

Figure 6:
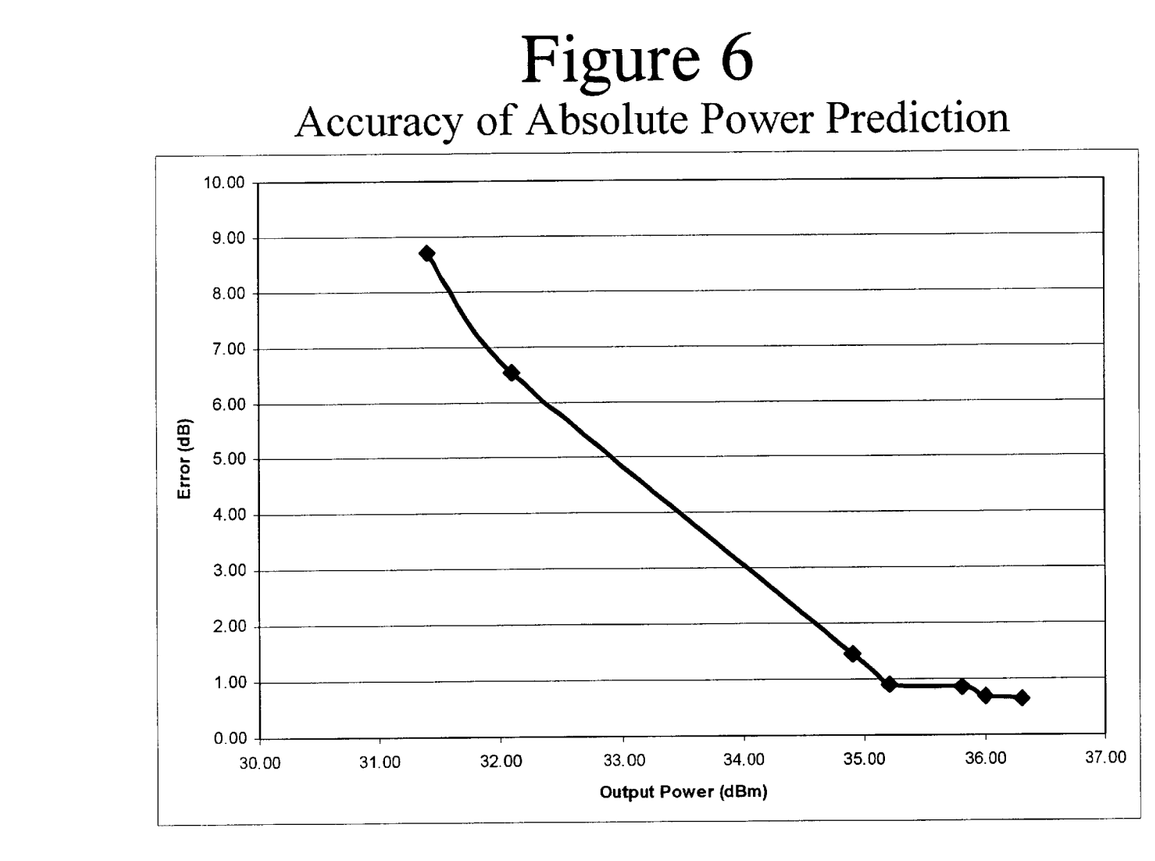
FIG. 6 is a graphical representation of the predicted output power in accordance with a power control system of the present invention.

With combined reference to FIG. 6, which is a graphical representation of the predicted output power and accuracy detailed in Table 2, it is clear that as the input power is increased towards the amplifier's saturation level, the accuracy of the predicted output power greatly improves. The data of Table 2 further indicates that the methods disclosed herein accurately predict the output power of the amplifier, namely, calculating the minimum of the 2nd derivative of the current curve yields a predicted output power of approximately 36 dBm (i.e., 4000 mW or 4 W). This data corresponds with the findings of Table 1 where the minimum of the second derivative yields a compression point of 1.0 dB. Thus, as would be expected a 4 watt amplifier has a P1 dB point at approximately 4 watts. Moreover, this data demonstrates that the systems and methods of the present invention accurately and reliably predict the output power level and the P1 dB compression point.

In the preferred embodiment, the IDU includes a suitable algorithm stored on a processing and memory means. The algorithm may, for example, include appropriate instructions and/or programming for extrapolating the point of inflection in the DC current curve (e.g., as detailed herein), and controlling the level of power input to the ODU. For example, an exemplary algorithm may cause the storage of a plurality of current values received from a current sensor; determine if the point of inflection has been reached; cause the increase of input power to the ODU if the point of inflection has not been reached; and cause the power control system to use an alternate method to strengthen the signal transmission to the satellite if the point of inflection has been reached.

Figure 7:
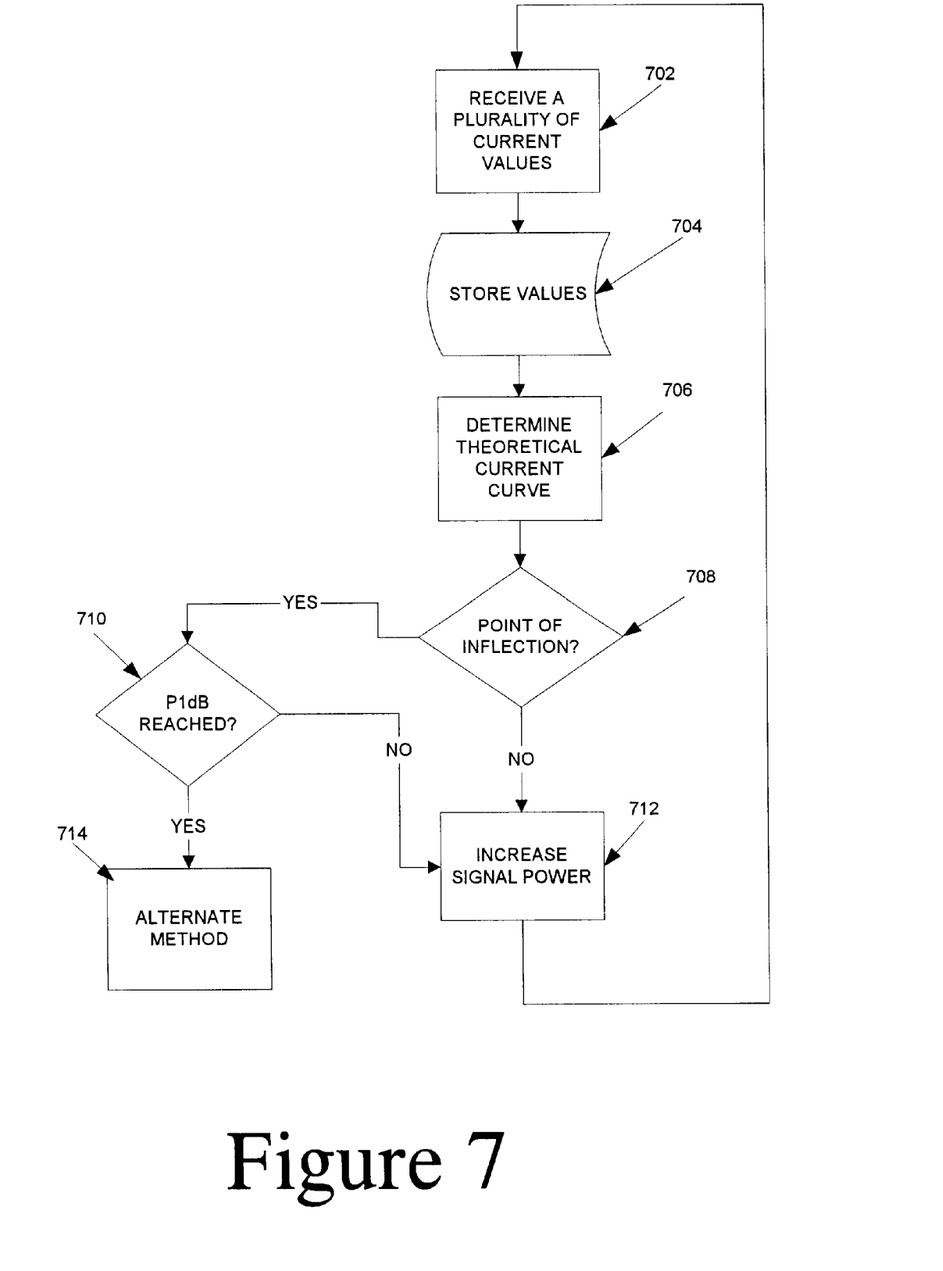
FIGS. 7 and 8 illustrate algorithm flow charts for power detection and control in accordance with the present invention.

FIG. 7 is a flow chart illustrating the steps of an exemplary algorithm that may be used in, for example, an IDU for controlling the level of power input to an ODU. The IDU supplies a DC power signal to the ODU, which in turn, amplifies and transmits the signal to, for example, a satellite. In a preferred embodiment, an algorithm, stored on a processing and memory means in communication with the IDU, provides instruction to the IDU for controlling the level of power supplied to the ODU. For example, the IDU may be instructed to receive a plurality of current values (step 702) as detected from a DC current sensor. The plurality of values may then be stored (step 704) in or on an appropriate storage medium, such as a database. The stored values may be updated, added or modified as additional current values are received. For example, at a certain RF power level, the DC current value may be stored and as the RF power level is increased, a next DC current value corresponding to the increased power level may then be stored. An appropriate theoretical curve can be extrapolated from the stored values (step 706), or alternatively, a mathematically equivalent may be determined.

By evaluating the curve, or equivalent, a point(s) of inflection can be assessed. Thus, a query may be performed to determine whether a point of inflection has occurred (step 708). If a point of inflection has occurred, then a user, or the system, may be placed on notice that the power level is approaching a maximum value. For instance, as detailed herein, the P1 dB compression point may be correlated to an inflection point in an extrapolated current curve. However, as previously discussed, the curve may have multiple points of inflection. There are various methods, as detailed herein, for determining whether the inflection point of interest corresponds to the P1 dB point, which will not be repeated here. A query can then be made to determine if P1 dB has been reached (step 710). If the query determines the inflection point of interest is not the P1 dB point, then the IDU may be instructed to increase the power to the ODU (step 712). If, however, the query determines the P1 dB point has been reached, then the system may be instructed to use an alternate method (other than directly increasing the power level from the IDU to the ODU) to strengthen the signal for transmission (step 714).

Any suitable algorithm stored on a processing device may be used in the IDU to control the supply of power to the amplifier (e.g., in the ODU). For example, in one embodiment, points on a curve may be plotted to generate a predicted current curve. The predicted curve may be fit to a polynomial equation to produce an actual function. Successive derivatives of the function can then be determined.

In another embodiment, points on a curve may be plotted at discreet levels. The difference between the points is used to determine the slope, which in turn can provide the derivative. After multiple points are determined, the second and third derivatives can be determined. The derivatives indicate which area of the curve the amplifier is operating in. For instance, if the derivatives are successively positive, the amplifier is likely to be operating at low compression and a safe distance from P1 dB (e.g., the left side of FIG. 5). As the derivatives become negative, the amplifier begins to approach higher compression. Referring back to Table 1 and FIG. 5, curve 502 represents the first derivative. When the slope of the first derivative changes from positive to negative, the maximum of the first derivative is reached; thus, indicating the amplifier is at about 0.2 dB compression and nearing P1 dB (1.0 dB). As the input power level is increased, the maximums of the second and third derivatives are reached which indicate the amplifier is nearing P1 dB. The minimum of the third derivative indicates roughly 0.8 dB compression and finally, the minimum of the second derivative indicates P1 dB is reached. Thus, the system and methods of the present invention provide multiple points on the power curve which offer an "alert mechanism" to the overall system and offer a prediction of future performance as power levels are increased. This mechanism eliminates the sudden reaching (and passing) of P1 dB without warning or the possibility of slowing prior to 1.0 dB.

Figure 8:
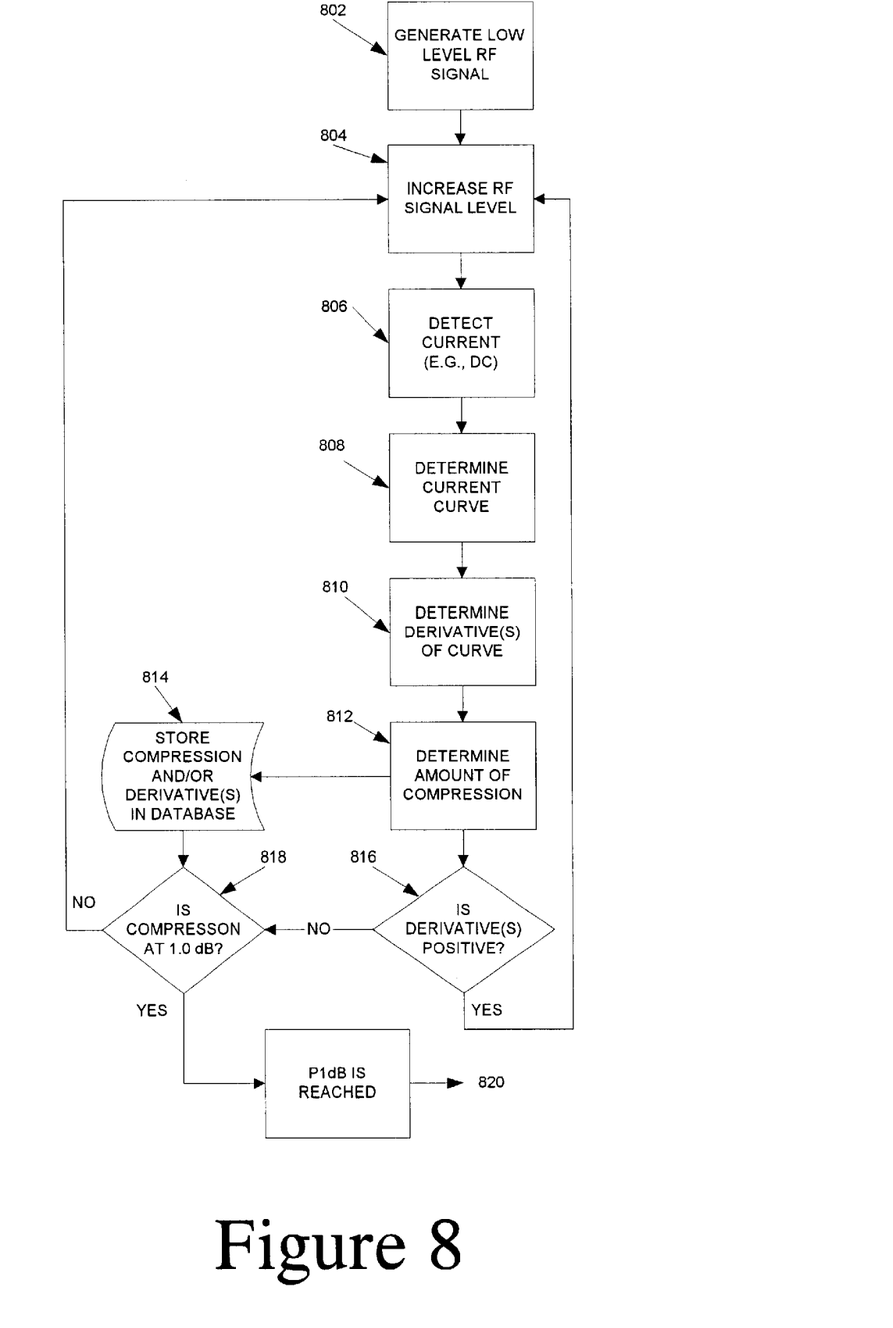

FIG. 8 is a flow chart illustrating the steps of an exemplary algorithm that may be used with the present invention to determine the P1 dB compression point. FIG. 8 and the following description is not intended to be limiting, but rather exemplary of one contemplated method. As previously detailed, it is desirous to limit the power output of an amplification device to the P1 dB compression point to minimize adjacent channel interference. By measuring the DC current change of the amplifier, P1 dB can be determined and the RF signal power to the amplifier can be controlled accordingly.

FIG. 8 is conveniently described for use in a satellite communication system having a ground station for transmitting and receiving signals between itself and a satellite; however, it should be recognized, that the application is not so limited. The IDU preferably includes a processing means and database for use in controlling the signal supply to the ODU in accordance with the techniques described herein. Initially, the IDU supplies IF and DC signals to the ODU to generate a low level RF signal (step 802). The IDU is then instructed to increase the signal supply to the ODU to generate a higher output RF signal (step 804). In one particular embodiment, the increase may be in a sequential step, e.g., 1 dB steps. Preferably, a current sensor, e.g., current sensor 332 of FIG. 3, located within the IDU detects the DC current supplied to the ODU (step 806). Using two or more current detect measurements, an appropriate curve can be plotted to generate a predicted current curve (step 808). Once the curve is determined, albeit graphically or mathematically, the derivative of the curve can be determined (step 810).

Determining the derivative of a curve can be equated by any suitable formula, equation, derivation, or the like, all of which are widely known and will not be discussed in great detail herein. As previously mentioned, the predicted current curve may be fit to a polynomial equation. Successive derivatives may then be equated by well known methods. Another technique involves first determining the slope of the curve, then the derivative. If multiple points on the curve are known, the second and third (and so on) derivatives can be determined. Again, calculating the derivatives in this manner are widely known and need not be discussed in detail. The examples for determining the derivatives discussed herein are merely provided to better the understanding of the invention. There are numerous other methods for determining the derivative of a function which are intended to be, and suitably are, within the scope of the invention.

The amount of compression can be determined, for example, by plotting successive points of the derivatives to form a curve (step 812). The maximum and minimums of the derivative curve indicate at which point the derivatives change from positive to negative and negative to positive. Because the basic shape of the current curve and corresponding derivatives does not change (even as environmental conditions and other circuit components change), once stored, the curves can be used to estimate the current position on the power versus current curve. For example, in the current curve, the maximum of the first derivative, the minimum of the second derivative, and the minimum of the third derivative will generally occur in that order, and the associated points will generally correspond to approximately 0.2 dB, 0.8 dB, and 1.0 dB compression respectively.

Therefore, as the system increases power past the maximum of the first derivative, it can be assumed that the amplifier is approaching P1 dB. In addition, an accurate estimation can be made of how far the system is operating from P1 dB. Using this estimate alone or in combination with similar estimates made at all of the derivative inflection points, the accuracy of the output power prediction can be refined and improved.

The amount of compression corresponding to the derivative(s) may then be stored in a suitable database for subsequent retrieval (step 814). In another embodiment, the database may contain previously stored data relating to compression levels and corresponding derivatives. This is possible because as previously mentioned the P1 dB point and various other points along the derivative curves are consistent through varying temperatures and units, even though the current curve itself may shift.

A query follows to determine whether the latest derivative value was positive (step 816). Successively positive derivative values indicate the system is operating at low compression levels. If the derivative is positive, then the IDU may be instructed to increase the signal power to the ODU (step 804) resulting in a higher RF signal output. If the query determines that the last derivative value is not positive, then the system may perform another query (step 818) to determine whether the stored compression point corresponding to the last derivative value is at 1.0 dB. If the compression point is not at 1.0 dB, then the IDU may be instructed to increase the signal power to the ODU (step 804). If the last query determines that the compression point is at 1.0 dB, then the P1 dB compression point has been reached (step 820).

In the event the P1 dB compression point has been reached, the IDU ceases increasing signal strength to the ODU. If, however, the satellite transmits to the ground station that the received RF signal is too weak and a stronger signal is needed, then the IDU may choose to reduce the bit rate of the data transmitted to the satellite through use of error correction coding, reduced bandwidth transmission, or other suitable means. As previously mentioned, a suitable algorithm may be employed to determine if the P1 dB point has been reached and instruct the IDU to use an alternate method to strengthen signal transmission to the satellite.

The exemplary algorithm of FIG. 8 may be expanded to include steps to determine the output power of the amplifier. In one embodiment, the query to determine whether the derivative is positive (step 816) may include a query to determine if the minimum of the derivative has been reached. In particular, a query to determine whether the minimum of the second or third derivative has been reached. If so, then the amplifier is operating at or very near the P1 dB compression point and presumed full operating power (e.g., a 4 watt amplifier achieves P1 dB around 4 watts which corresponds to the minimum of the second derivative of the current curve). Alternatively, the query may be divided into several steps or include queries to determine if minimums of derivatives have been reached.

For the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

It should be appreciated that the particular implementations shown and described herein are illustrative of various embodiments of the invention including its best mode, and are not intended to limit the scope of the present invention in any way. For instance, while conveniently described in connection with a satellite communication system, various other applications may benefit as well. Generally, various other systems where power detection and control is needed may be well suited for the present invention, for example, microwave communication systems, such as in a cellular base station. Additionally, described herein are points corresponding to the first, second, and third derivatives; however, successive derivatives beyond the third may be useful to provide a finer detail of the operating level of the amplifier. Also, the data provided on the Tables and Figures was not intended to limit the scope of the invention, but rather, was provided merely to ease the understanding of the invention. The data corresponding to the various maximums, minimums, and so on, may be varied and yet the spirit of the invention will remain intact. These and other changes or modifications are intended to be included within the scope of the present invention, as expressed in the following claims.

I claim:

1. A satellite ground station system of the type capable of receiving and transmitting RF signals to a satellite, a transmitted RF signal having a transmission power level as determined by a signal control unit of said system, said signal control unit responding to a computer program coupled to said unit, said computer program including code to instruct the signal control unit to:

control the power level of said transmitted RF signal in accordance with a DC current sensing system, wherein said signal control unit causes said DC current sensing system to detect a plurality of current levels; and adjust said power level in accordance with a maximum transmission power level, said maximum transmission power level in accordance with a mathematical relationship between said current levels and a P1 dB compression point of said satellite ground station system.

2. The system of claim 1 wherein said mathematical relationship comprises predicting a current curve comprised of said plurality of current levels.

3. The system of claim 1 wherein said maximum transmission power level corresponds to a derivative of a current curve comprising said plurality of current levels.

4. The system of claim 1 wherein said maximum transmission power level corresponds to a second derivative of a current curve comprising said plurality of current levels.

5. The system of claim 4 wherein said maximum transmission power level corresponds to a minimum of said second derivative.

6. An uplink power control system for a satellite communication station, said system transceiving RF signals with a satellite, said power control system comprising:

a control unit having a modem and a DC current sensing mechanism, said modem providing a signal for transmission to said satellite in accordance with said DC current sensing mechanism;

an antenna unit having an antenna for receiving said RF signal from said satellite and transmitting an RF signal to said satellite, said transmitted RF signal in accordance with said signal for transmission received from said modem of said control unit;

a signal transfer means between said control unit and said antenna unit; and a processor in communication with said control unit, said processor having code stored thereon to cause said DC current sensing mechanism to detect a DC current supplied to said antenna unit, to calculate an amount of compression of said system, and to instruct said control unit based on said amount of compression.

7. The power control system of claim 6 wherein said DC current sensing mechanism comprises a DC current sensor in electrical communication with an RF power control device.

8. The power control system of claim 6 wherein said compression is determined from at least two DC currents detected by said DC current sensing mechanism.

9. The power control system of claim 8 wherein said compression is determined from calculating at least one mathematical derivative.

10. The power control system of claim 9 wherein said compression is determined from calculating a first and a second mathematical derivative.

11. The power control system of claim 6 wherein said signal transfer means comprises a cable.

12. A method for signal control in a satellite ground station, said station configured for transmitting and receiving signals between a satellite, and said satellite ground station, said method comprising:

receiving, at a transceiver unit of said station, a signal for satellite transmission from a control unit of said station;

detecting, at said control unit, a DC current supplied to said transceiver unit in the presence of said signal for satellite transmission;

determining at least one derivative from a mathematical expression derived from at least two DC current values from said detecting step;

modulating said signal in accordance with said determining step; and transmitting said modulated signal from said transceiver unit to said satellite.

13. The method of claim 12 wherein said determining step comprises determining a P1 db compression point.

14. The method of claim 12 wherein said determining step comprises determining an inflection point in a theoretical current curve comprising a plurality of current points.

15. The method of claim 12 wherein said determining step comprises determining a second derivative.

16. The method of claim 12 wherein said modulating step comprises increasing or decreasing said signal strength.

17. The method of claim 12 comprising determining a plurality of said derivatives.

18. The method of claim 17 further comprising storing said derivatives in a memory means.

19. The method of claim 18 further comprising providing a prediction of power output of said station in accordance with an analysis of said derivatives.

20. The method of claim 19 further comprising updating said prediction of power output as more derivatives are determined and stored.

21. A computer program embodying instructions executable by a processing means to perform method steps for determining a compression point in a satellite uplink power control system, the system including a control unit having processing means and an antenna unit configured to communicate with said control unit over a communication channel, said method steps comprising:

generating a signal in said control unit to produce a low level RF signal in said antenna unit;

increasing said signal strength in said control unit to produce a higher level RF signal in said antenna unit;

detecting, in said control unit, a current level in said signal;

determining, in said control unit, a derivative of a theoretical current curve created from at least two detected DC current levels;

determining, in said control unit, a compression corresponding to said derivative;

comparing said compression to a maximum compression; and repeating the method steps until said comparing step determines said maximum compression has been reached.

22. The computer program of claim 21 wherein said determining a derivative comprises determining a second derivative.

23. The computer program of claim 21 wherein said maximum compression comprises P1 dB compression.

24. The computer program of claim 21 further comprising determining, in said control unit, an output power of said system corresponding to said derivative.

25. The computer program of claim 21 further comprising storing said current level in a database.

26. The computer program of claim 21 further comprising storing said derivative in a database.

27. The computer program of claim 21 further comprising storing a plurality of derivatives in a database.

28. The computer program of claim 27 further comprising retrieving said plurality of derivatives and determining from said plurality of derivatives an output power level of said system.

29. A method for predicting an output power in a transmission signal for use in a power control system of a ground station, wherein said power control system is configured to facilitate satellite communication, said method comprising the steps of:

generating a transmission signal in said power control system;

detecting DC current levels in said transmission signal;

determining a theoretical curve from at least two of current levels detected in said signal;

determining a derivative of said curve;

storing said derivative in said memory; and determining, from a look-up table stored on said memory, a predicted output power corresponding to said derivative.

30. The method of claim 29 further comprising determining a plurality of derivatives.

31. The method of claim 30 further comprising updating said predicted output power.

* * * * *